United States Patent
Lingam et al.

(10) Patent No.: US 9,231,648 B2
(45) Date of Patent: Jan. 5, 2016

(54) METHODS AND APPARATUS FOR FREQUENCY OFFSET ESTIMATION AND CORRECTION PRIOR TO PREAMBLE DETECTION OF DIRECT SEQUENCE SPREAD SPECTRUM (DSSS) SIGNALS

(71) Applicant: Texas Instruments Incorporated, Dallas, TX (US)

(72) Inventors: Srinivas Lingam, Dallas, TX (US); Timothy Mark Schmidl, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/638,299

(22) Filed: Mar. 4, 2015

(65) Prior Publication Data

US 2015/0341078 A1    Nov. 26, 2015

Related U.S. Application Data (60) Provisional application No. 62/001,289, filed on May 21, 2014.

(51) Int. Cl.
*H04B 1/7075*      (2011.01)

(52) U.S. Cl.
CPC .................................... *H04B 1/7075* (2013.01)

(58) Field of Classification Search
CPC ............ H04B 1/707; H04B 1/30; H04B 1/69; H04B 1/709; H04B 1/7075; H04B 1/7093; H04B 1/7115; H04L 27/38; H04L 2027/0095; H04L 27/0002; H04L 27/22; H04L 27/362; H04L 1/0045
USPC ......... 375/130, 140, 147, 150, 316, 340, 326, 375/142, 143, 152, 343, 354
See application file for complete search history.

(56) References Cited

U.S. PATENT DOCUMENTS

| 5,303,257 A | 4/1994 | Stein et al. | |
|---|---|---|---|
| 2002/0004405 A1* | 1/2002 | Laugeois et al. | 455/501 |

(Continued)

FOREIGN PATENT DOCUMENTS

EP      0892528 B1      4/2004

OTHER PUBLICATIONS

Perisa, I.; Lindner, J., "Code Acquisition in Direct Sequence Spread Spectrum Communication Systems Using an Approximate Fast Fourier Transform," Spread Spectrum Techniques and Applications, 2006 IEEE Ninth International Symposium on, pp. 54, 58, Aug. 28-31, 2006, retrieved from world wide web, URL: http://ieeexplore.ieee.org/stamp/stamp.jsp?tp=arnumber=4100522&isnumber=4100502.

(Continued)

*Primary Examiner* — Vineeta Panwalkar
(74) *Attorney, Agent, or Firm* — Lawrence J. Bassuk; Frank D. Cimino (57) ABSTRACT

Methods and apparatus for frequency offset estimation and correction prior to preamble detection of DSSS signals. An integrated circuit is disclosed including a receiver circuit having an input coupled to receive a DSSS signal, the receiver circuit configured to sample the DSSS signal and to output a sequence of digital samples; carrier frequency offset estimation logic configured to perform a carrier frequency offset estimation on the digital samples; carrier frequency correction logic configured to correct the carrier frequency of the sequence of digital samples using the carrier frequency offset estimation and to output a sequence of corrected digital samples; offset quadrature phase shift keying (O-QPSK) demodulation logic configured to perform demodulation on the corrected digital samples and further configured to output symbols corresponding to the corrected digital samples; and preamble identification configured to identify and detect a preamble sequence in the symbols. Additional methods and apparatus are disclosed.

20 Claims, 6 Drawing Sheets

(56) References Cited

U.S. PATENT DOCUMENTS

2005/0195888 A1 9/2005 Hou
2013/0202014 A1 8/2013 Schmidl

OTHER PUBLICATIONS

Diez, J.; Pantaleon, C.; Vielva,L.; Santamaria, I.; Ibanez, J., "A Simple Expression for the Optimization of Spread-Spectrum Code Acquisition Detectors Operating in the Presence of Carrier-Frequency Offset," Communications, IEEE Transactions on, vol. 52, No. 4, pp. 550-552, Apr. 2004, retrieved from world wide web, URL: http://ieeexplore.ieee.org/stamp/stamp.jsp?tp=&arnumber=1291794&isnumber=28774.

IEEE Standards Association, IEEE Standard for Local and Metropolitan area Networks: Part 15.4: Low-Rate Wireless Personal Area Networks (LR-WPANs), Amendment 3: Physical Layer (PHY) Specifications for Low-Data-Rate, Wireless, Smart Metering Utility Networks, IEEE Computer Society, Apr. 27, 2012, IEEE 3 Park Avenue, New York, NY, 10016.

Wikipedia contributors. Direct-sequence spread spectrum. Wikipedia, The Free Encyclopedia. Feb. 21, 2015, 14.58 UTC. Available at: http://en.wikipedia.org/w/index.php?title=direct-sequence_spread_spectrum&oldid=648192432. Accessed Mar. 4, 2015.

* cited by examiner

FIG. 7 ns of the present application
is not limited to particular environment, including the SUN
applications, but the various arrangements that form aspects
of the present application are applicable to such applications.

Figure 1:
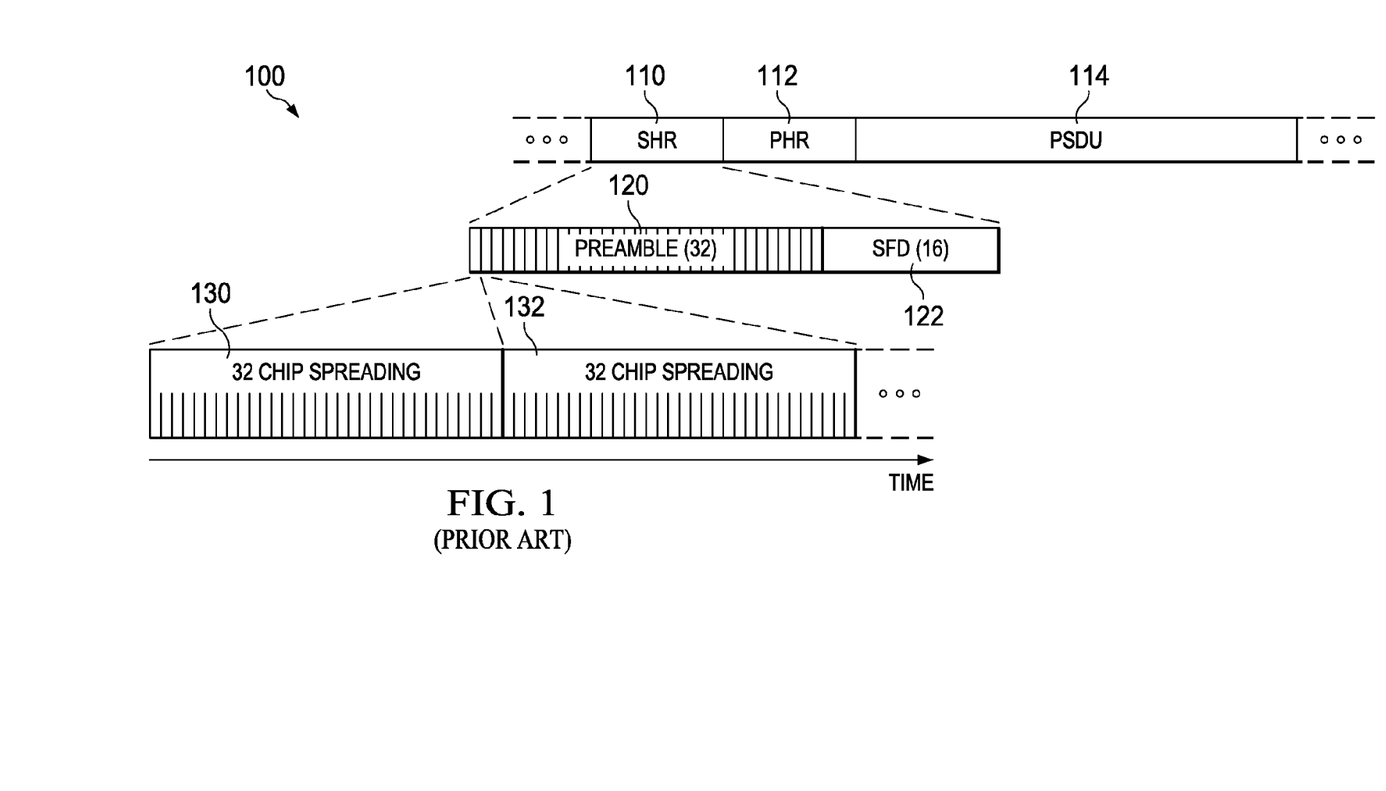
FIG. 1 is an illustration of a prior art 100 kchip/sec DSSS physical layer packet as defined by the IEEE 802.15.4g specification.

FIG. 1 is an illustration of a portion of a 100 kchip/sec
DSSS physical layer packet as defined by the IEEE 802.15.4g
specification. In a DSSS communication system, a "chip"
refers to a single electrical pulse with duration equal to 1/chip
second rate. For example, in a 100 Kchip rate system, the chip
duration would be 1/100,000=10 uS. The DSSS packet 100 in
FIG. 1 includes fields such as a synchronization header (SHR)
110, physical layer header (PHR) 112 and a physical layer
service data unit (PSDU) 114. Each SHR contains a preamble
120 and a start frame delimiter (SFD) 122 that can be utilized
by the receiver for detecting the DSSS packet. For the 100
kchip/s mode, the preamble 120 contains 32 bits that are
spread with a spreading code of 32 to form a string of 1024
chips (32 bits×32 spread) as indicated 130, 132. The SFD 122
contains 16 bits that are also spread with spreading code of 32.
An aspect of the current application provides methods and
apparatus that will improve the detection of the preamble 120.

In the example communications systems described herein,
phase shift keying is used to modulate data. In phase shift
keying (PSK), digital modulation is used to transmit data by
modulating the phase of a reference signal or carrier. In
quadrature phase shift keying (QPSK), four points on a constellation diagram are used that are equispaced around a
circle, providing four phases. Accordingly 2 bits can be used
to indicate the quadrature phase. In the examples described
here, offset QPSK or O-QPSK modulation is used. In
O-QPSK, the two portions, the in-phase and quadrature components or I and Q components of a symbol, are transmitted
with an offset between them. In this fashion only one bit of a
two bit coding scheme changes at a given time and thus
reception errors that could occur in the reception of the symbols due to noise or interference can be reduced.

Figure 2:
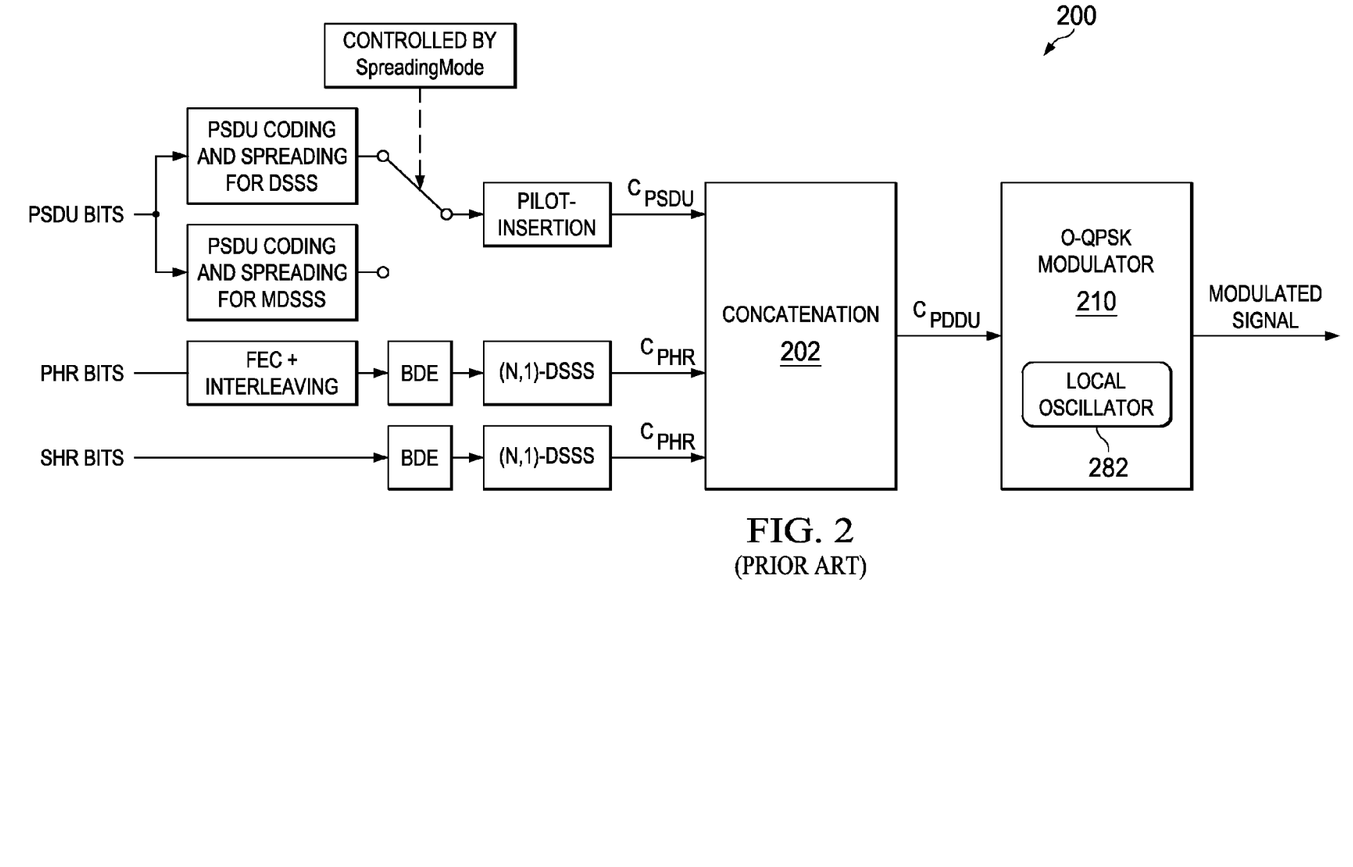
FIG. 2 is a block diagram depicting a standardized transmitter of the prior art for DSSS packets, as defined by the IEEE 802.15.4g specification.

FIG. 2 is a block diagram depicting a standardized transmitter of the prior art for DSSS packets, as defined by the
IEEE 802.15.4g specification. The chip timing for the Offset
Quadrature Phase Shift Key (O-QPSK) modulator 210 is
shown in FIG. 1. Transmitted data is coded, spread and concatenated at 202 before being coupled to the O-QPSK modulator 210. The O-QPSK modulator 210 contains a local oscillator 282 that is designed to oscillate at the same prescribed
frequency as the receiver's local oscillator and serves to generate the transmitter's carrier frequency. The receiver has the
same frequency for demodulation of received signals.

Figure 3:
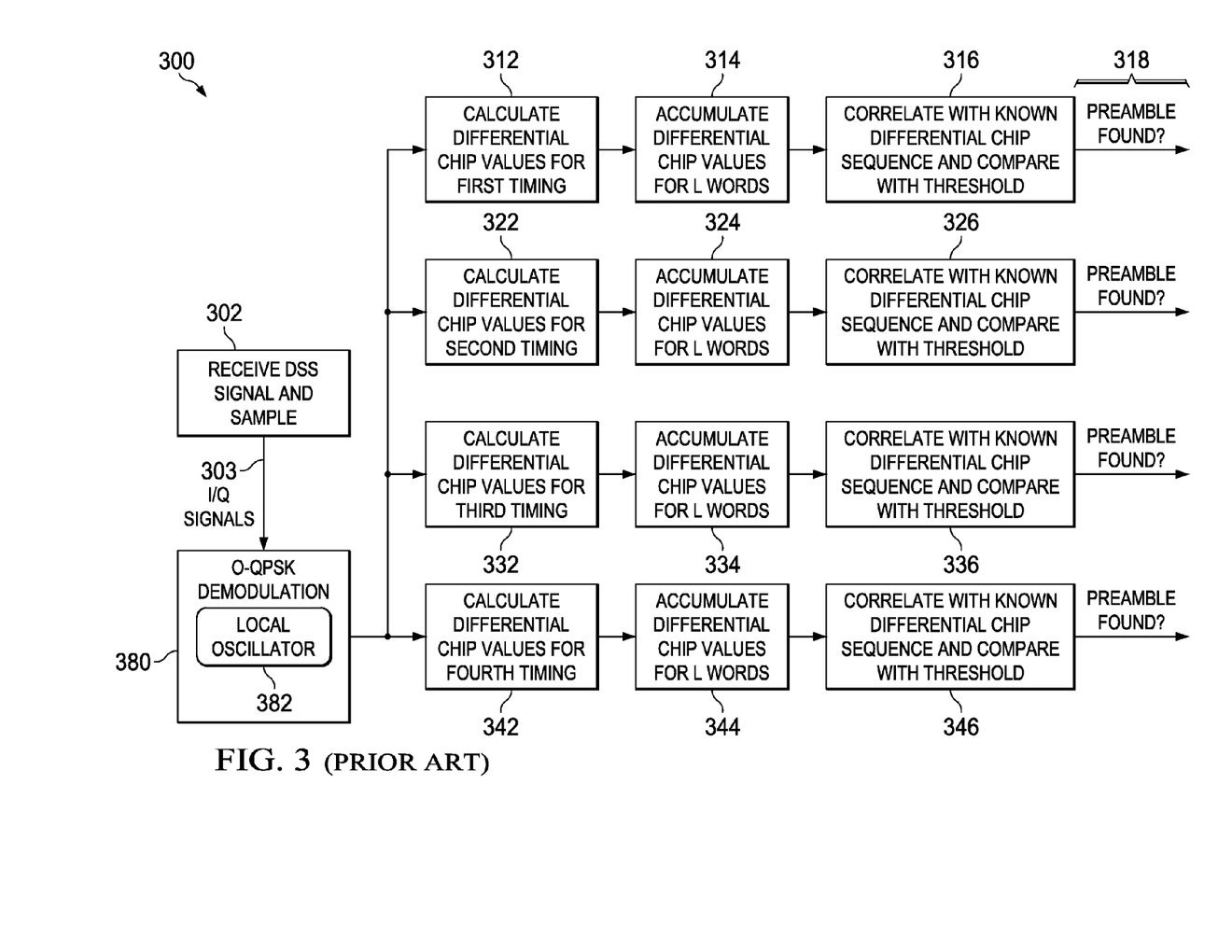
FIG. 3 is a block diagram depicting detection of DSSS preambles using differential sequences.

FIG. 3 is a block diagram depicting a prior art system 300
performing the detection of DSSS preambles using differential sequences. In FIG. 3, the receiver/sampler 302 is coupled
to the O-QPSK demodulator 380. Within the demodulator
380, a local oscillator 382 is designed to oscillate at the same
prescribed frequency as the transmitter's local oscillator
(shown in FIG. 2, above). The O-QPSK demodulator 380 is
coupled to, for example, a chip differential block 312 which is
coupled to an accumulation block 314. The accumulation
block 314 is coupled to a correlation block 316 which produces an output 318, indicating that the preamble has been
found. The flow 312-316 is illustrated for the first sample.
Similar processing occurs for each subsequent timing signal
as they arrive as illustrated by the 3 flows 322-326 for $2^{nd}$
sample, 332-336 for $3^{rd}$ sample and 342-346 for $4^{th}$ sample.

In this example 300, 4× over sampling is used to sample the
signal in block 302 at 4 discrete times. The 4 signal samples
arrive sequentially at the rate of one sample per oversample
clock. The processing of each of the signal samples is illustrated by the series of 3 blocks 312, 314, 316. The processing

METHODS AND APPARATUS FOR FREQUENCY OFFSET ESTIMATION AND CORRECTION PRIOR TO PREAMBLE DETECTION OF DIRECT SEQUENCE SPREAD SPECTRUM (DSSS) SIGNALS

CROSS-REFERENCE TO RELATED APPLICATIONS

The present application claims priority to U.S. Provisional Application Ser. No. 62/001,289, filed on May 21, 2014, entitled "Frequency offset estimation and correction on oversampled signal prior to acquisition or preamble detection of direct sequence spread spectrum (DSSS) signal for smart utility networks," which application is hereby incorporated in its entirety herein by reference.

TECHNICAL FIELD

The present application relates to communication systems, and in particular to direct sequence spread spectrum (DSSS) signal communications systems. More specifically, the arrangements that form aspects of the present application relate to the carrier frequency offset correction in received DSSS communications such as are used, for example but without limiting the present application, in smart utility network systems.

BACKGROUND

DSSS networks are used in implementing over the air systems. In one example, a smart utility network (SUN) is a low rate (5 kb/s to 1 Mb/s), low power, wireless communications technology that is specifically designed to be used in utility metering applications, such as for transmitting electric, gas, or water usage data from the one or more meters on the customer premises to a data collection point operated for the utility. The data collection point can then be connected to a central office for the utility by a similar or a different interface, which can be a high speed "backhaul" such as an optical fiber, copper wire, or other high speed wired connection to a network including the central office.

In the prior known solutions, different physical layers (PHYs) can be used for communication in over the air networks such as SUN including frequency shift keying (FSK), direct sequence spread spectrum (DSSS), and orthogonal frequency division multiplexing (OFDM). In an example DSSS communications system that is a closed utility network, the devices that are allowed into the network can be controlled by the utility or the network operator. Note that while some of the examples discussed herein for illustration include the operation of smart utility networks, the arrangements disclosed as aspects of the present application are not so limited and can be applied and used in conjunction with DSSS communications networks, generally.

A relevant standard has been promulgated by the IEEE, referred to as IEEE standard number 802.15.4g, entitled "Low-Rate Wireless Personal Area Networks (LR-WPANs)" issued Apr. 27, 2012 by the IEEE Computer Society and sponsored by the LAN/MAN Standards Committee. This standard identifies physical layer (PHY) specifications for low data rate, wireless, smart metering utility networks (SUN). The standard is intended to provide a globally used standard that facilitates very large scale process control applications such as a utility smart-grid network that are capable of supporting large, geographically diverse networks with minimal infrastructure and containing potentially millions of fixed in each of the blocks (312, 314 and 316) is completed within 1 oversampled clock period. Although the processing flow for each of the 4 timing samples is depicted in 300, in the actual receiver, there may only be a single instance of each block since the sampled signal arrives and is processed sequentially through the blocks. Alternatively, more blocks can be used.

In operation, as shown in FIG. 3, a DSSS signal is received from an antenna, for example, and sampled at 4× the chip rate in block 302. The I/Q signals 303 are passed to the O-QPSK demodulator 380 where the I/Q signals are down-converted utilizing the receiver's local oscillator 382 as the carrier frequency. The differential chip values for the first phase are calculated in block 312 and accumulated together with prior data in block 314. After accumulation, each sample can be correlated in block 316 to a known chip spreading value and the result can be compared to a threshold value. When the threshold value is exceeded, that result indicates that a preamble has been located (in block 318). In one approach a single signal sample can be used to detect a preamble location in the sequence, however, processing of additional signal samples 322-342 improves the success of preamble detection and improves the performance of the system by detecting the preamble using the corrected carrier frequency. The use of the arrangements can enable preamble detection even in environments with low signal to noise (SNR) characteristics, including environments with interfering devices.

An example DSSS signal preamble detection system is described in U.S. Patent Application Publication No. US 2013/0202014A1, entitled "DSSS Preamble Detection for Smart Utility Networks," to Timothy Mark Schmidl, which is co-owned with the present application, and which application is hereby incorporated in its entirety herein by reference.

The DSSS receivers can be used in a utility network. For example, utility meters are typically installed for each house in a residential neighborhood. The meter data can be transmitted wirelessly via a RF transmission and be received and read by either a mobile or fixed point collection device called a reader. Some meters will broadcast periodically so the reader is simply a receiver. In other instances, the customer premises meter's transmitter remains in a sleeping state waiting for a transmission or poll message from the reader. The reader's transmission makes the meter "wake up" and transmit the accumulated data which is then received by the reader.

Mobile readers can be vehicle mounted or carried in person by a meter reader or otherwise deployed. For the safest and fastest data collection, the mobile readers prefer to stay on public thoroughfares, so that there is no need to enter the customer's property. This allows utility meter data collection under circumstances where the meter cannot be seen, when the customer is not home, the property has dangerous conditions such as construction or dogs present or some other impediment that makes physically reading the meter data difficult. The RF meter data collection occurs by maneuvering the mobile reader close enough to the meter to enable the signal to be read. At the end of a route or meter reading session, the mobile reader returns to a central office or base location and the meter readings are transferred for processing.

Mobile readers are very common and a meter reader simply checks out a reader prior to collecting data on a route. Because the meters are used in this fashion, there is an opportunity for a different physical reader being used along a given route at different reading times. Each of the readers includes a DSSS receiver that performs the preamble detection process as described above, including having a different local oscillator which can be oscillating at a different frequency from the prior readers used to read the meters on a route.

A characteristic feature of utility networks is that the customer meters often have a long life span, such as 20 years, and across an established utility area there are typically many generations of customer meters deployed. Within these meters, the local oscillators are initially designed to have the same frequency, however because of component tolerances, temperature, aging and other imperfections, the local oscillator frequency of the transmitters can drift from the intended frequency resulting in a large carrier frequency offset between the transmitter/receiver pair. This carrier frequency offset characteristic makes preamble detection more difficult for the DSSS receiver by causing a continuous rotation in the signal constellation, thus slowing down the process of reading meters sometime requiring either multiple passes, entering the customer premises to obtain the meter reading and eventually replacing the meter. The preamble detection can also be performed in a low signal to noise ratio environment, where the signal is compromised by various interference or noise sources. Carrier frequency offset in a low SNR environment can cause prior known approaches to preamble detection to fail or to cause the need for repeated attempts. While these problems are presented in a utility meter example above, carrier frequency offset between receivers and transmitters can occur in other DSSS communications systems and the arrangements of the present application apply to DSSS systems generally, as well as to SUN applications. Generally, the arrangements of the present application improve performance in DSSS signaling systems where carrier frequency offset can occur between a transmitter and a receiver.

Figure 4:
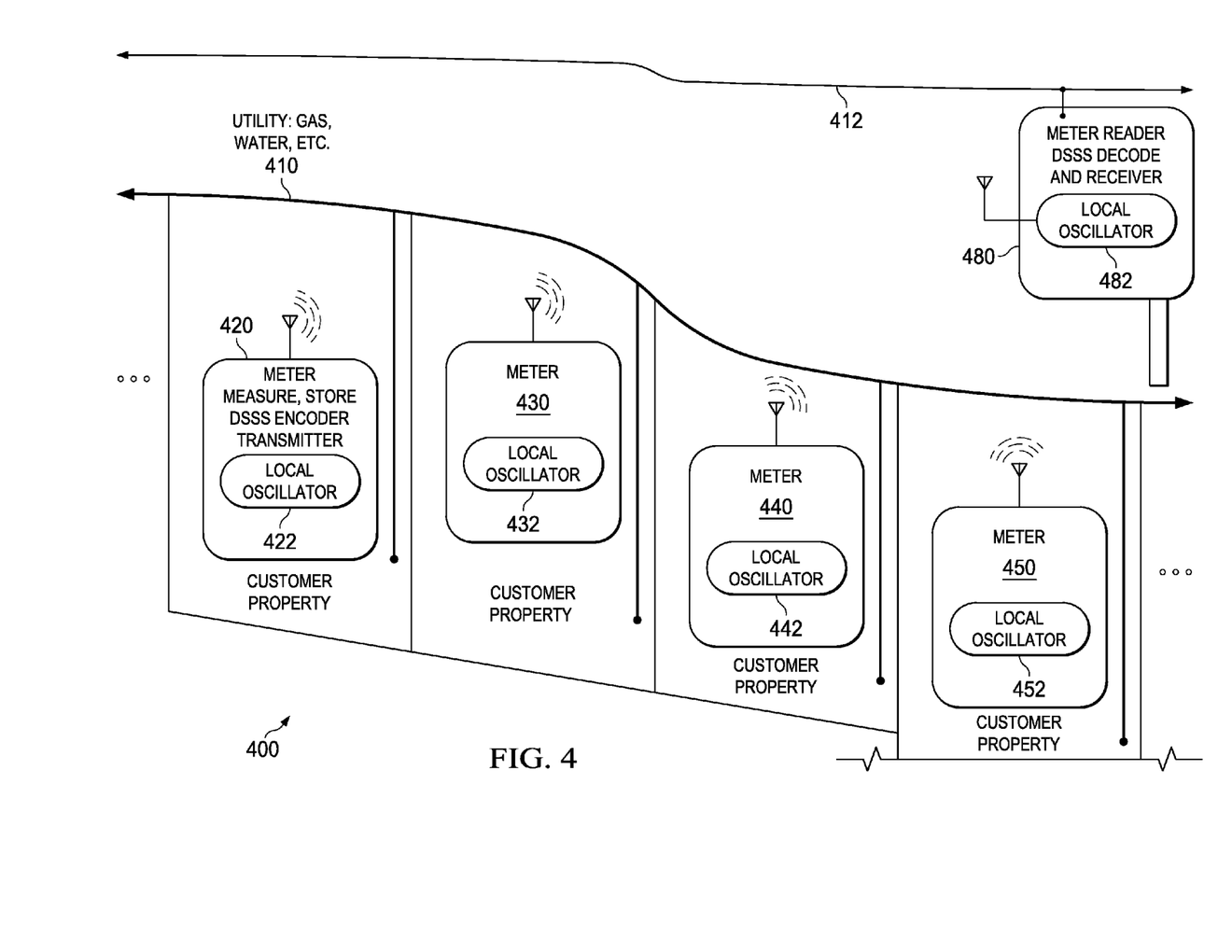
FIG. 4 depicts a fixed receiver with several smart meters and their local oscillators for use with arrangements of the present application.

FIG. 4 depicts in a block diagram a communications network 400 with a fixed receiver 482 with several smart meters and their local oscillators. In FIG. 4, a utility 410, such as gas, water or electricity, is available through an area where customers are provided with smart meters (420, 430, 440, 450) each having the capability to measure the consumption of the utility, and to transmit that information using the DSSS coding and a local oscillator (422, 432, 442, 452) set to a prescribed frequency. A fixed meter reader 480 is depicted with a DSSS receiver and local oscillator 482 set to a prescribed frequency. The reader 480 is connected to a link 412 which transfers collected data back to a billing center or central office. The link 412 could be implemented as copper, fiber, or wireless method and can be referred to as a "backhaul." Fixed readers 480 are typically mounted on pole tops and can be connected to the main office by various methods including copper, fiber optics or wirelessly 412. Fixed readers offer the utility lower recurring costs since the meter readings occur automatically without the need for an employee to either walk or drive the route to collect readings. Imperfections in the local oscillators in the devices (422, 432, 442, 452 and 482) cause a carrier frequency offset. The carrier frequency offset results in difficulty for the DSSS receiver in the fixed meter 480 to detect the preamble needed receive the DSSS header sent by the smart meters (420, 430, 440, 450). This degradation in preamble detection can reduce the number of meters a fixed reader can service in a fixed period. In other situations, the data may have to be collected by a mobile reader placed closer to the customer premises, causing additional expense.

Improvements in the reception of DSSS signals having carrier frequency offset, or reduction of carrier frequency offset in received signals which will improve the preamble detection in DSSS systems, are therefore needed in order to address the deficiencies and the disadvantages of the prior known approaches. In the SUN application, improvements which will extend the utility meters useable lifetime and improve a meter reader's ability to capture meter data are desirable.

SUMMARY

In the arrangements that form various aspects of the present application, the arrangements address receiving DSSS signals that can have carrier frequency offset and the arrangements reduce or eliminate the carrier frequency offset in the received signals prior to the preamble detection. Use of DSSS transceivers that can exhibit large carrier frequency offset characteristics, such as aging smart meters, is facilitated without the need to replace the transceivers or the smart meters including the transceivers.

In an illustrative arrangement that forms an aspect of the present application, an integrated circuit for receiving direct sequence spread spectrum (DSSS) signals includes: a receiver circuit having an input coupled to receive a DSSS signal from an over the air interface, the receiver circuit including analog to digital converter circuitry coupled to the input and configured to sample the DSSS signal and further configured to output a sequence of digital samples corresponding to the DSSS signal; carrier frequency offset estimation logic coupled to the sequence of digital samples from the receiver circuit and configured to perform a carrier frequency offset estimation on the sequence of digital samples; carrier frequency correction logic coupled to the carrier frequency offset estimation logic and configured to correct the carrier frequency of the sequence of digital samples using the carrier frequency offset estimation, and configured to output a sequence of corrected digital samples; offset quadrature phase shift keying (O-QPSK) demodulation logic coupled to the carrier frequency correction logic and configured to perform demodulation on the corrected digital samples and further configured to output symbols corresponding to the corrected digital samples; and preamble identification logic coupled to receive the symbols output by the O-QPSK demodulation logic and configured to identify and detect a preamble sequence in the symbols.

In a further illustrative arrangement that forms an additional aspect of the present application, a method for performing preamble detection in a direct sequence spread spectrum (DSSS) signaling system includes receiving DSSS signals on an over the air interface; sampling the received DSSS signals using a sampling frequency fs; converting the samples of the received DSSS signals to form digital samples in a sequence representative of the DSSS signals; using the digital samples, performing a carrier frequency offset estimation to determine a carrier frequency offset Δf; using the carrier frequency offset Δf, correcting the digital samples to form corrected digital samples representative of the DSSS signal with a corrected carrier frequency; subsequently, performing offset quadrature phase shift keying (O-QPSK) demodulation for the corrected digital samples to form demodulated corrected digital samples; and using one or more predetermined preamble sequences, correlating known preamble values to a differential sequence formed from the demodulated corrected digital samples in order to detect a preamble sequence present in the received DSSS signals.

In still another arrangement that forms an additional aspect of the present application, a communications device for receiving direct sequence spread spectrum (DSSS) signals includes a receiver coupled to an input and configured to receive a DSSS signal; the receiver including analog to digital converter circuitry coupled to sample the received DSSS signal and configured to output a sequence of digital samples corresponding to the DSSS signal; carrier frequency offset estimation logic coupled to receive the digital samples and configured to perform a carrier frequency offset estimation on the sequence of digital samples; carrier frequency correction logic configured to use the carrier frequency offset estimation to correct the carrier frequency and outputting a sequence of corrected digital samples; offset quadrature phase shift keying (O-QPSK) demodulation logic coupled to receive the corrected digital samples and configured to perform demodulation on the corrected digital samples and to output symbols corresponding to the corrected digital samples; and preamble identification logic coupled to the O-QPSK demodulation logic and configured to identify and detect a preamble sequence in the symbols output from the O-QPSK demodulation logic.

Various alternative arrangements that form additional aspects of the present application are also described below which are contemplated by the inventors and which fall within the scope of the appended claims.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

The making and using of various example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, nor do they limit the scope of the appended claims.

For example, when the term "coupled" is used herein to describe the relationships between elements, the term as used in the specification and the appended claims is to be interpreted broadly, and while the term "coupled" includes "connected," the term "coupled" is not to be limited to "connected" or "directly connected" but instead the term "coupled" may include connections made with intervening elements, and additional elements and various connections may be used between any elements that are described as "coupled."

In an aspect of the present application, a coarse carrier frequency offset estimation is performed and the received signal samples are then corrected for the carrier frequency offset prior to detecting the preamble sequence. By performing this novel process prior to attempting to detect the preamble, the accuracy of the preamble detection is increased, greatly improving system performance. The carrier frequency offset estimation can be performed quickly and can be used to correct the sampled I/Q signals prior to demodulation, and existing systems can easily be modified to incorporate the novel process and added functions.

Figure 5:
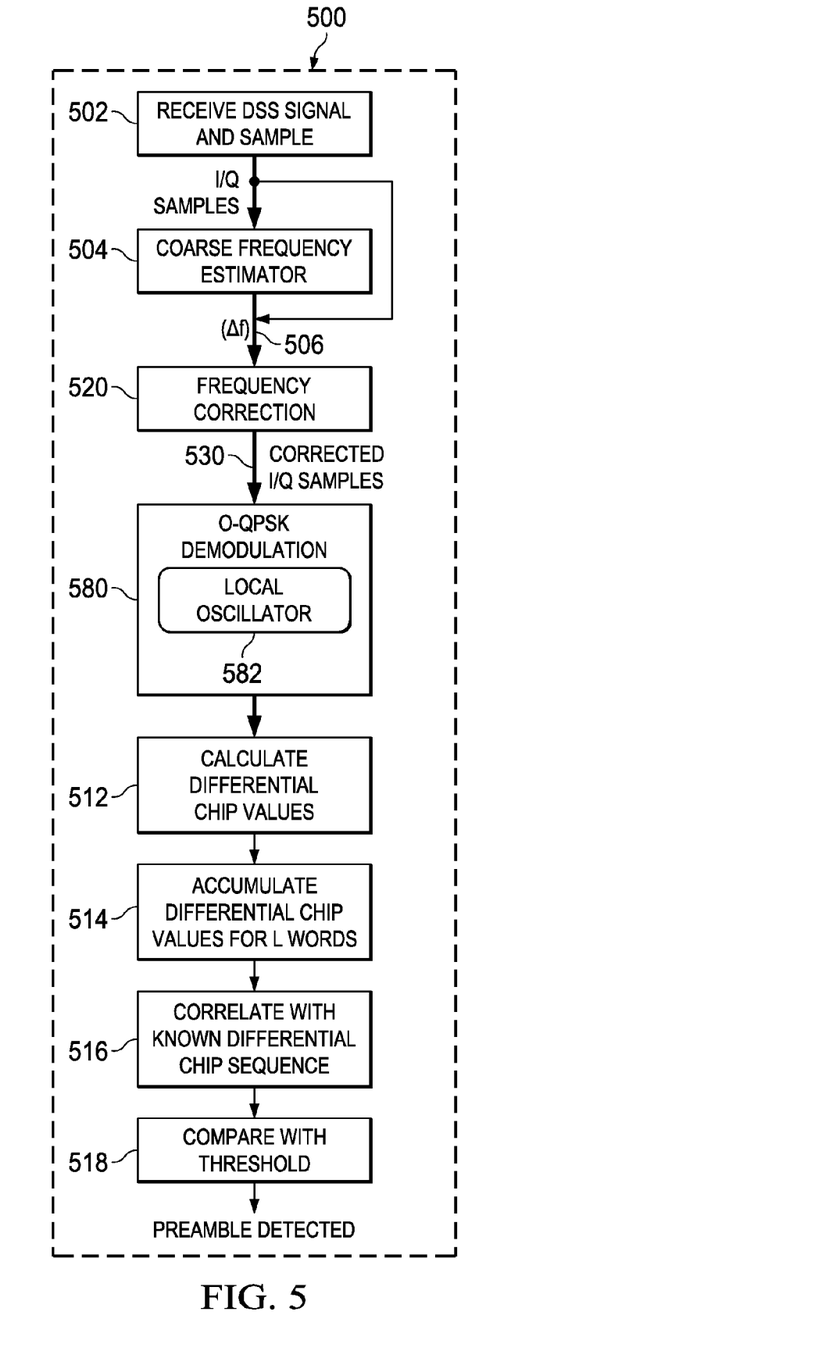
FIG. 5 depicts in block diagram a device configured to detect DSSS preambles incorporating aspects of the present application.

FIG. 5 is a system block diagram 500 depicting detection of DSSS preambles with aspects of the current application included. The system 500 can, in one arrangement that forms an aspect of the present application, be formed as a single integrated circuit. In alternative arrangements that form additional aspects of the present application, the system 500 can be implemented as a module including two or more integrated circuits. Further, the blocks of system 500 can be implemented as dedicated hardware such as logic gates and digital circuitry. In additional arrangements that form additional aspects of the present application, the blocks of system 500 can be implemented by programming a programmable processor, such as a digital signal processor, microprocessor, microcontroller, RISC core or ARM core, to perform the functions of each of these blocks. Configurable logic such as ASIC and FPGA devices can be used to implement the blocks of system 500. In system 500, the DSSS receiver/sampler 502 is coupled to a coarse carrier frequency estimator 504. The carrier frequency estimator is coupled to the frequency correction block 520. The frequency correction block 520 is coupled to the O-QPSK demodulator 580. The demodulator 580 is the first stage of a DSSS preamble detector, such as that shown in FIG. 3. The O-QPSK Modulator contains a local oscillator 582. The preamble detection is performed by block 512, which calculates differential chip values for a first timing. The processing continues in block 514, which accumulates differential chip values for a sample of L words, and in block 516, which correlates the differential chip values with a predetermined differential chip sequence for a preamble, and finally in block 518, which compares the correlation with a threshold to determine whether a preamble has been detected.

In one aspect of the present application, in operation of system 500, a DSSS signal can be received and over-sampled in the block 502 at 2, 3, 4 or any other integer multiple of the chip rate within the DSSS signal. A downconversion is performed by the receiver to center the received signal at a baseband or intermediate frequency. The downconversion involves mixing the over the air signals at the receiver with the locally generated carrier frequency. This results in a signal centered at a baseband frequency or 0 Hz. In an alternate approach the received over the air signals are mixed with a locally generated carrier that is offset from the transmitter carrier frequency, resulting in an intermediate frequency that is non-zero. The resulting intermediate frequency can vary from, for example, 200 kHz to 4 MHz depending on the signal bandwidth and the sampling frequency. The samples undergo an analog to digital conversion to form digital I and Q ("I/Q") samples. The resulting digital I/Q signal samples 510 can then be used to find a coarse carrier frequency offset. The estimate for the coarse carrier frequency offset is performed in block 504. The coarse carrier frequency offset $\Delta f$, labeled 506, can be obtained from any valid technique for frequency offset estimation.

One illustrative method of determining the coarse carrier frequency offset $\Delta f$ from oversampled digital I/Q signals is described in Equation 1:

$$\Delta f = f_s \frac{(\angle d)}{(2\pi)}, \text{ where } d = \left(\frac{1}{L}\right)\sum_{n=0}^{L-1} x^*(n)x(n+1) \quad \text{(Equation 1)}$$

Where $\Delta f$ is the frequency estimate, $f_s$ is the sample rate of the signal and $\angle$ is the angle operator indicating which quadrature the signal originates in the QPSK encoding. L is the number of samples used for estimation and is based on the estimation delay and error tolerance, ranging from 32 (1 preamble bit) to 1024 (32 preamble bits). x(n) is the received oversampled signal. x*(n) is the complex conjugate operator applied to the oversampled signal x(n).

In addition to the example offset carrier frequency estimate of Equation 1, in alternative arrangements that form aspects of the present application that are also contemplated herein, the coarse frequency offset estimate $\Delta f$ can be formed using other known carrier frequency offset estimate methods.

In system 500 in FIG. 5, the resulting carrier frequency offset estimate ($\Delta f$) 506 can then be applied to the original digital I/Q samples in a frequency correction process 520 which produces corrected I/Q samples 530.

One method of applying the frequency offset ($\Delta f$) is described by Equation 2:

$$y(n) = x(n)e^{-j2\pi\left(\frac{\Delta f}{f_s}\right)n}, n = [0, \ldots L-1] \quad \text{(Equation 2)}$$

Where y(n) is each of the frequency offset corrected oversamples; x(n) is the received oversampled signal sample, L is the number of samples used for estimation and can range from 32 (1 preamble bit) to 1024 (32 preamble bits), $\Delta f$ is the frequency estimate, fs is the sample rate of the signal. L is chosen based on the estimation delay and error tolerance.

In this example, a delay and buffer of a depth of at least L samples can be used in order to apply the frequency offset correction. In another alternative arrangement, a tradeoff can be made between implementation complexity and buffer delay vs the accuracy of the applied correction. In this alternative arrangement that forms an additional aspect of the present application, the above calculation can be performed with a buffer length of L2 samples, where $L_2 = L/k$ with k being an integer value of 1, 2, 3 or 4.

In the operation of system 500, in FIG. 5, the corrected digital I/Q samples are output to the O-QPSK demodulator 580 for further processing. The samples are processed using down conversion using the carrier frequency produced by the receiver's local oscillator 582. Typical processing such as code acquisition, chip timing acquisition and additional fine frequency offset estimation can be performed. The O-QPSK demodulator 580 and the blocks 512, 514, 516 and 518 can then locate the DSSS preamble sequence in the corrected digital samples of the received DSSS signals with more accuracy than was possible using the prior known approaches. Use of the corrected digital samples obtained using the offset frequency estimation of block 504 and correction of block 520 prior to the O-QPSK demodulation in this aspect of the current application enhances DSSS signal preamble detection because of the reduction or elimination of carrier frequency offset between the transmitter's local oscillator (such as element 282 shown in FIG. 2) and the receiver's local oscillator 582. Advantageously, in the novel methods of the present application, the carrier frequency offset estimate and carrier frequency correction is performed prior to the signal processing and prior to preamble detection. In the novel arrangements of the present application, preamble detection is far more likely, and the preamble detection can occur at lower signal to noise ratios (lower SNR) when the carrier frequency offset is first corrected, prior to performing the preamble detection steps.

Figure 6:
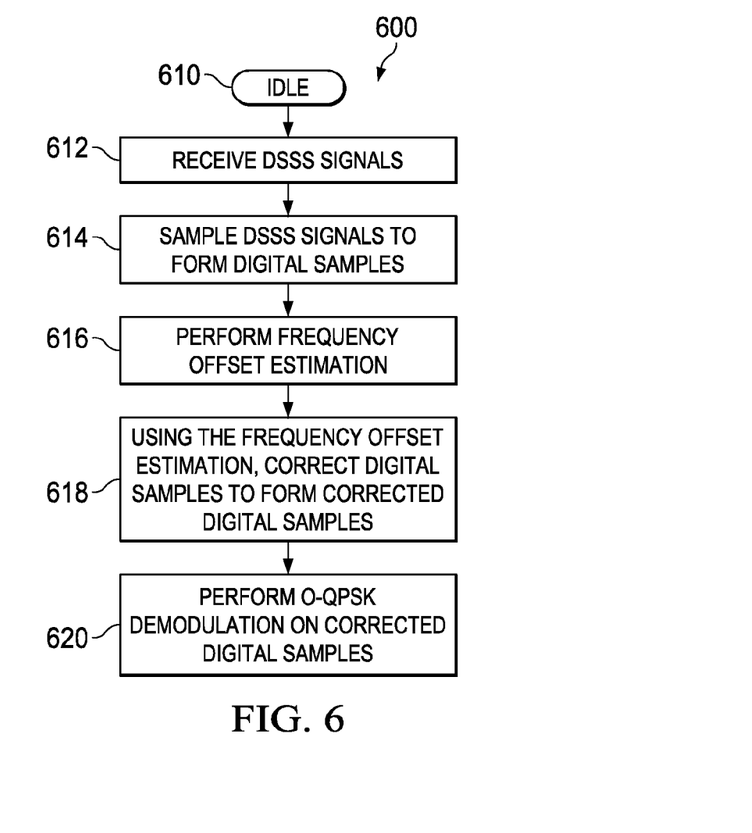
FIG. 6 illustrates in a flow diagram a method arrangement of the present application.

FIG. 6 depicts in a flow diagram a method arrangement 600 that forms another aspect of the present application. The method 600 begins in an Idle state 610. The method 600 transitions to step 612 when the receiver begins receiving DSSS signals. At step 614 the DSSS signals are sampled using an oversampling frequency fs, and analog to digital conversion is performed to convert the samples to digital samples that represent the DSSS signals. At step 616 a coarse carrier frequency offset estimation is performed. In one arrangement as described above, the coarse carrier frequency offset estimation shown in Equation 1 can be performed. In alternative arrangements that form additional aspects of the present application, alternative methods for performing the carrier frequency offset can be performed. At step 618, the carrier frequency offset obtained can be used to form corrected digital samples. In the example arrangement described above, the correction can be performed as shown in Equation 2. In an alternative arrangement that is also contemplated as forming an additional aspect of the present application, correction of the digital samples can be performed using other correction methods. The corrected digital samples are then used in subsequent signal processing steps. As described above, the number of samples L used in the correction step can be varied. As described above, the length L of the samples can be reduced to a smaller length L2, which can be formed by dividing L by an integer to obtain a reduced sample length. These alternatives form additional aspects of the present application that are also contemplated by the inventors and which fall within the scope of the appended claims. In step 620, the demodulation and detection of the preamble sequence are performed using the corrected digital samples.

The methods disclosed herein can be implemented in a variety of ways. The methods can be implemented and performed by programmable devices executing stored instructions, for example. The methods can be implemented in software or in firmware or machine language instructions. Alternatively, programmable logic can be used to form dedicated hardware solutions. Devices that can be configured to perform the methods, including field programmable gate arrays (FPGAs), complex logic programmable devices (CPLDs) and application specific integrated circuits (ASICs) can be used to implement the arrangements. A system on a chip (SOC) integrated circuit can be formed including a DSSS receiver with a signal sampler and ADC converter for forming digital samples can be used. A processor such as a CPU, microprocessor (MPU), microcontroller unit (MCU), mixed signal processor (MSP) or a digital signal processor (DSP) and memory including RAM, ROM, Flash, volatile and non-volatile types, EEPROM and the like can be used. The arrangements can be implemented using several commercially available integrated circuits on a circuit board or on a multiple chip module to form a complete solution. Each of these alternatives forms additional arrangements that are contemplated by the inventors and which form additional aspects of the present application.

Figure 7:
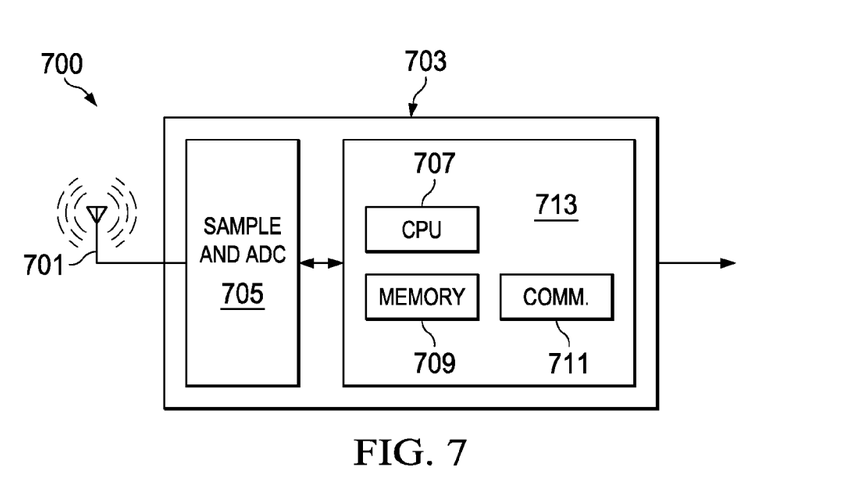
FIG. 7 illustrates in a block diagram a system arrangement of the present application.

FIG. 7 depicts in a simple block diagram an example arrangement that forms an additional aspect of the present application. In FIG. 7, a system 700 is formed using an antenna 701 for receiving and transmitting RF signals using a physical layer that includes DSSS signals. In system 700, a module 703 includes an analog portion 705 including a sampling circuit and an analog to digital converter for receiving DSSS signals, performing downconversion to a baseband or an intermediate frequency, and outputting digital I/Q samples. The analog portion 705 uses a sampling frequency fs that is an oversampling frequency that is a multiple of a chip rate of the DSSS signals. The digital signals output by the analog portion 705 are then transferred to a digital portion 713. In the digital portion 713, the digital samples are input to a memory 709 that is coupled to the CPU 707. In an example arrangement of the present application, the CPU 707 executes instructions to perform the carrier frequency offset estimate, the offset carrier frequency correction to form corrected digital samples, and the O-QPSK demodulation needed, including preamble detection, performed on the corrected digital samples, as described above.

In FIG. 7, in one arrangement that forms an aspect of the present application, the module 703 can be implemented as a single integrated circuit including the sampling and analog to digital converter 705, and the digital portion 713. Alternative arrangements can include a module with an analog portion including 705 on an integrated circuit or module, and a digital portion 713 which can be a single integrated circuit including the CPU 707 and the communications device 713, for example.

The system 700 can be used to implement a meter reader in a SUN, as described above. The system 700 can be part of a fixed data collection station associated with a plurality of customer meters. Alternatively the system 700 can be part of a mobile meter reader. Advantageously, use of the arrangements of the present application allow the reception of DSSS signals with significant carrier frequency offset. In a network including transmitters that are within aging equipment, such as smart meters located on customer premises, the arrangements of the present application can be placed in a central data collection station and improve the preamble detection of the DSSS signals without the need for replacing the various smart meters; instead the central data collection station can efficiently detect preambles even in DSSS signals with significant carrier frequency offset at the transmitters.

The system 700 can be used in the data collection station. In an alternative arrangement that forms an additional aspect of the present application, the system 700 can be used to implement a smart meter at a customer premise. Further, the applications of the arrangements are not limited to the SUN examples described herein. The system 700 can improve the performance of any DSSS signal system where carrier frequency offset is possible in the DSSS signals.

Various modifications can also be made in the order of steps and in the number of steps to form additional novel arrangements that incorporate aspects of the present application, and these modifications will form additional alternative arrangements that are contemplated by the inventors as part of the present application and which fall within the scope of the appended claims.

Although the example illustrative arrangements have been described in detail, it should be understood that various changes, substitutions and alterations can be made herein without departing from the spirit and scope of the present application as defined by the appended claims. Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. An integrated circuit for receiving direct sequence spread spectrum (DSSS) signals, comprising:
    a receiver circuit having an input coupled to receive a DSSS signal from an over the air interface and configured to down convert the received signal form a carrier frequency to a frequency selected from one of a baseband frequency and an intermediate frequency, the receiver circuit including analog to digital converter circuitry coupled to the input and configured to sample the DSSS signal, and further configured to output a sequence of digital samples corresponding to the DSSS signal;
    carrier frequency offset estimation logic coupled to the sequence of digital samples from the receiver circuit and configured to perform a carrier frequency offset estimation on the sequence of digital samples;
    carrier frequency correction logic coupled to the carrier frequency offset estimation logic and configured to correct the carrier frequency of the sequence of digital samples using the carrier frequency offset estimation, and configured to output a sequence of corrected digital samples;
    offset quadrature phase shift keying (O-QPSK) demodulation logic coupled to the carrier frequency correction logic and configured to perform demodulation on the corrected digital samples and further configured to output symbols corresponding to the corrected digital samples; and
    preamble identification logic coupled to receive the symbols output by the O-QPSK demodulation logic and configured to identify and detect a preamble sequence in the symbols.

2. The integrated circuit of claim 1, and further including a microprocessor coupled to a memory storing instructions for the microprocessor which, when executed by the microprocessor, cause the microprocessor to perform at least the carrier frequency estimation logic and the carrier frequency correction logic.

3. The integrated circuit of claim 2, the carrier frequency offset estimation logic configured to perform a carrier frequency offset estimation on the sequence of digital samples further including:
    multiply logic configured to calculate, for each of a number of L samples, where L is an integer number of preamble bits, a product of a complex conjugate of each one of the L samples and the next sample in the sequence of digital samples;
    summing logic coupled to receive the products and configured to form a sum of the products, d; and
    multiplier logic configured to determine a carrier offset frequency by multiplying a sample frequency fs by 1/(2 times π) times the quantity of an angle operator applied to the quantity d.

4. The integrated circuit of claim 3, the carrier frequency correction logic configured to use the carrier frequency offset estimation to correct the carrier frequency further including:
    multiply logic configured to multiply each digital sample n with n ranging from zero to L−1 by the quantity $e-j2\pi(\Delta f/fs)n$, where $\Delta f$ is a carrier frequency offset, and further configured to output the resulting products to form a corrected digital sample for each digital sample.

5. The integrated circuit of claim 2, the preamble identification logic further including:
    logic configured to receive the symbols output by the O-QPSK demodulation logic and configured to calculate differential chip values;
    logic configured to accumulate the differential chip values for L words, where L is an integer number of preamble bits;
    logic configured to perform a correlation between a predetermined chip sequence corresponding to a preamble and the accumulated differential chip values; and
    logic configured to compare the correlation to a threshold.

6. The integrated circuit of claim 5, and further including:
    logic configured to output a preamble detected signal, responsive to the compare.

7. A method for performing preamble detection in a direct sequence spread spectrum (DSSS) signaling system, comprising:
    receiving DSSS signals on an over the air interface;
    sampling the received DSSS signals using a sampling frequency fs;
    converting the samples of the received DSSS signals to form digital samples in a sequence representative of the DSSS signals;
    using the digital samples, performing a carrier frequency offset estimation to determine a carrier frequency offset $\Delta f$;
    using the carrier frequency offset $\Delta f$, correcting the digital samples to form corrected digital samples representative of the DSSS signal with a corrected carrier frequency;
    subsequently, performing offset quadrature phase shift keying (O-QPSK) demodulation for the corrected digital samples to form demodulated corrected digital samples; and
    using one or more predetermined preamble sequences, correlating known preamble values to a differential sequence formed from the demodulated corrected digital samples in order to detect a preamble sequence present in the received DSSS signals.

8. The method of claim 7, and performing the carrier frequency offset further including:
    for each of a number of L samples, where L is an integer corresponding to a number of preamble bits, forming a product of the complex conjugate of each one of the digital samples and the next digital sample in the sequence of digital samples;
    calculating a total sum of the products, d; and
    using an angle operator, forming the carrier frequency offset $\Delta f$ by multiplying the sampling frequency fs by 1/(2 times π) multiplied by the quantity given from the angle operator applied to the quantity d.

9. The method of claim 8, and forming corrected digital samples further including:
    for each digital sample, forming a corrected digital sample using an index n ranging from zero to L−1 samples, the quantity formed by multiplying each digital sample value from zero to L−1 by the quantity $e-j2\pi(\Delta f/fs)n$.

10. The method of claim 8, and forming corrected digital samples further including:

for each corrected digital sample, forming a buffer length of integer L2 which is less than L; and for each corrected digital sample, using an index n ranging from zero to L2−1 digital samples, multiplying each digital sample value for n from zero to L2−1 by the quantity $e-j2\pi(\Delta f/fs)n$.

11. The method of claim 10, and further including forming the integer L2 by dividing the integer L by k, where k is an integer from one to four.

12. The method of claim 8, in which L is a positive integer in a range from 64 to 1536.

13. The method of claim 7, in which the sampling frequency fs is an oversampled frequency of at least twice a chip rate.

14. A communications device for receiving direct sequence spread spectrum (DSSS) signals, comprising:

a receiver coupled to an input and configured to receive a DSSS signal and to down convert the DSSS signal to an intermediate frequency;

the receiver including analog to digital converter circuitry coupled to sample the received DSSS signal and configured to output a sequence of digital samples corresponding to the DSSS signal;

carrier frequency offset estimation logic coupled to receive the digital samples and configured to perform a carrier frequency offset estimation on the sequence of digital samples;

carrier frequency correction logic configured to use the carrier frequency offset estimation to correct the carrier frequency and outputting a sequence of corrected digital samples;

offset quadrature phase shift keying (O-QPSK) demodulation logic coupled to receive the corrected digital samples and configured to perform demodulation on the corrected digital samples and to output symbols corresponding to the corrected digital samples; and preamble identification logic coupled to the O-QPSK demodulation logic and configured to identify and detect a preamble sequence in the symbols output from the O-QPSK demodulation logic.

15. The communications device of claim 14, and further including a microprocessor and a memory, the microprocessor coupled to the memory that is storing instructions for the microprocessor which, when executed by the microprocessor, cause the microprocessor to provide at least the carrier frequency estimation logic and the carrier frequency correction logic.

16. The communications device of claim 14, the carrier frequency offset estimation logic configured to perform a carrier frequency offset estimation on the sequence of digital samples further including:

multiply logic configured to calculate, for each of a number of L samples, where L is an integer number of preamble bits, a product of a complex conjugate of each one of the samples and the next sample in the sequence of digital samples;

summing logic configured to determine a total sum of the products, d; and multiply logic configured to determine a carrier offset frequency by multiplying a sample frequency fs by 1/(2 times π) times the quantity of an angle operator applied to the quantity d.

17. The communications device of claim 16, the carrier frequency correction logic configured to use the carrier frequency offset estimation to correct the carrier frequency further including:

multiply logic configured to multiply each digital sample n by the quantity $e-j2\pi(\Delta f/fs)n$, where $\Delta f$ is a carrier frequency offset, and to form products and to output the products to form a corrected digital sample for each digital sample.

18. The communications device of claim 14, the preamble identification logic coupled to the O-QPSK demodulation logic further including:

logic configured to receive the symbols output by the demodulation logic and to calculate differential chip values;

logic configured to accumulate differential chip values for L words, where L is a positive integer corresponding to a preamble length;

logic configured to perform a correlation between a predetermined chip sequence corresponding to a known preamble sequence and the accumulated differential chip values; and logic configured to compare the correlation to a threshold and configured to output a signal indicating a preamble has been detected, responsive to the compare.

19. The communications device of claim 14, in which the communications device comprises a smart meter located at a customer premises for a utility.

20. The communications device of claim 14, in which the communications device comprises a data collection device for receiving smart meter information over an over the air interface.

* * * * *